United States Patent
Levy et al.

(10) Patent No.: US 10,878,392 B2
(45) Date of Patent: Dec. 29, 2020

(54) CONTROL AND ACCESS OF DIGITAL FILES FOR THREE DIMENSIONAL MODEL PRINTING

(71) Applicant: Microsoft Technology Licensing, LLC, Redmond, WA (US)

(72) Inventors: Nir Levy, Tel Aviv (IL); Benny Schlesinger, Ramat Hasharon (IL); Ola Lavi, Herzliya (IL); Avi Sagiv, Ramat Hasharon (IL); Dana Porter Rubinshtein, Herzliya (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 877 days.

(21) Appl. No.: 15/195,688

(22) Filed: Jun. 28, 2016

(65) Prior Publication Data
US 2017/0372284 A1 Dec. 28, 2017

(51) Int. Cl.
| | | |
|---|---|---|
| *G06F 17/50* | (2006.01) | |
| *G06Q 20/12* | (2012.01) | |
| *G06F 16/951* | (2019.01) | |
| *G06F 16/178* | (2019.01) | |
| *G06F 16/2457* | (2019.01) | |
| *B33Y 50/00* | (2015.01) | |
| *G06F 30/00* | (2020.01) | |
| *B33Y 50/02* | (2015.01) | |
| *B33Y 80/00* | (2015.01) | |
| *G06Q 30/06* | (2012.01) | |

(Continued)

(52) U.S. Cl.
CPC .......... *G06Q 20/1235* (2013.01); *B33Y 50/00* (2014.12); *B33Y 50/02* (2014.12); *B33Y 80/00* (2014.12); *G06F 16/1794* (2019.01); *G06F 16/24573* (2019.01); *G06F 16/951* (2019.01); *G06F 30/00* (2020.01); *G06Q 30/0629* (2013.01); *G06F 2111/02* (2020.01); *G06Q 10/06* (2013.01)

(58) Field of Classification Search
CPC ...................................................... G06F 17/50
USPC ...................................................... 705/26.64
See application file for complete search history.

(56) References Cited

U.S. PATENT DOCUMENTS

| 8,243,334 B2 | 8/2012 | Abeloe |
|---|---|---|
| 8,355,526 B2 | 1/2013 | Decker et al. |

(Continued)

OTHER PUBLICATIONS

Satkin, et al., "Data-Driven Scene Understanding from 3D Models", In Proceedings of the 23rd British Machine Vision Conference, Sep. 3, 2012, 11 pages.

(Continued)

*Primary Examiner* — Russell S Glass
(74) *Attorney, Agent, or Firm* — Talem IP Law, LLP

(57) ABSTRACT

Control and access of digital files for three dimensional (3D) model printing are supported by an authorized 3D model marketplace. At a system providing the 3D model marketplace, a 3D model file catalog can be searched using a search input that may be at least one image to identify possible results. At least two options for a specific result of the possible results can be available. The at least two options can include an original quality 3D model file and a degrade option 3D model file. The degrade option 3D model file may represent a lower quality or altered version of the original quality 3D model file and can be generated from the original quality 3D model file upon selection of the degrade mode option.

20 Claims, 6 Drawing Sheets

(51) Int. Cl.
G06Q 10/06 (2012.01)
G06F 111/02 (2020.01)

(56) References Cited

U.S. PATENT DOCUMENTS

| | | | |
|---|---|---|---|
| 8,412,588 B1 | 4/2013 | Bodell et al. | |
| 8,699,787 B2 | 4/2014 | van den Hengel et al. | |
| 8,922,547 B2 | 12/2014 | Lim et al. | |
| 2007/0196030 A1* | 8/2007 | Grimaud | G06T 17/00 382/276 |
| 2009/0322860 A1 | 12/2009 | Zhang et al. | |
| 2012/0246029 A1* | 9/2012 | Ventrone | G06Q 30/06 705/26.63 |
| 2013/0016098 A1 | 1/2013 | Addessi | |
| 2015/0112835 A1 | 4/2015 | Stewart | |
| 2015/0220291 A1 | 8/2015 | Tapley et al. | |
| 2015/0220748 A1* | 8/2015 | Leach | G06F 21/10 726/26 |
| 2016/0048609 A1* | 2/2016 | Voris | B29C 64/386 700/98 |

OTHER PUBLICATIONS

Wu, et al., "Waldo3D: Printing 3D Models from 2D Pictures", In Proceedings of 23rd International Conference on Software Engineering and Data Engineering, Oct. 13, 2014, 6 pages.

Min, Patrick, "A 3D Model Search Engine", In Thesis for the Degree of Doctor of Philosophy, Jan. 2004, 139 pages.

Kholgade, et al., "3D Object Manipulation in a Single Photograph using Stock 3D Models", In Proceedings of ACM SIGGRAPH, vol. 33 Issue 4, Jul. 27, 2014, 13 pages.

Billy, "How to Make a 3D Model from Photos in 5 Easy Steps", Published on: Aug. 20, 2014, Available at: http://i.materialise.com/blog/how-to-make-a-3d-printed-object-from-a-photo-in-5-easy-steps.

Sales, et al., "3D Objects Watermarking and Tracking of Their Visual Representations", In Proceedings of Third International Conferences on Advances in Multimedia, Apr. 17, 2011, pp. 111-113.

Xu, et al., "Photo-Inspired Model-Driven 3D Object Modeling", In Proceedings of ACM Transactions on Graphics, vol. 30, No. 4, Jul. 2011, 10 pages.

Funkhouser, et al., "A Search Engine for 3D Models", In Proceedings of ACM Transactions on Graphics, vol. 22 Issue 1, Jan. 1, 2003, pp. 1-28.

"Morpheus—How it works", Published on: Oct. 30, 2013, Available at: http://www.morphe.us.com/page/howItWorks.

Aubry, Mathieu, "Representing 3D models for Alignment and Recognition", In Proceedings of Computer Vision and Pattern Recognition, May 8, 2015, 183 pages.

"Thingiverse", Retrieved on: Aug. 31, 2015, Available at: http://www.thingiverse.com/.

"International Search Report and Written Opinion Issued in PCT Application No. PCT/US2017/038634", dated Oct. 2, 2017, 17 Pages.

\* cited by examiner

CONTROL AND ACCESS OF DIGITAL FILES FOR THREE DIMENSIONAL MODEL PRINTING

BACKGROUND

Three-dimensional (3D) printing, also known as additive manufacturing, is the process of making a solid 3D object from a digital file. 3D printing has become a popular way for consumers and manufacturers to create objects, with demand continuing to grow. While technology is rapidly advancing in the field of 3D printing, 3D printers remain expensive and the average consumer may not have access to a 3D printer and the professional software required to create a 3D object.

A 3D printing marketplace can be helpful to expand usage of 3D printing. A 3D printing marketplace refers to an online service where users can buy, sell, and fully share 3D digital files of 3D objects. However, in current 3D printing marketplaces, searching for the correct 3D object can be challenging and time consuming for the user. It is not uncommon for the user to perform a search of the marketplace without knowing the exact name or part number of the object he or she is searching for, making it difficult to find the correct match. Further, when a search provides a large list of results, each offering a different variation of the object, the user may be left feeling overwhelmed.

BRIEF SUMMARY

Control and access of digital files for 3D model printing are supported by an authorized 3D model marketplace. An authorized 3D model marketplace platform ("marketplace platform") and an authorized 3D model marketplace service ("marketplace service") are described that provide a marketplace that enables ease of search and protects rights holders by providing a degrade mode for files not having full authorized use. According to certain embodiments, search input, such as an image or a text string (or a combination thereof), facilitates the search of the marketplace.

A marketplace application can take an image and/or text string to search a 3D model file catalog through an online marketplace (e.g., via an "app store"). For example, a user can take or select an image (such as a 2D image) using their mobile device and use the marketplace application to search the online marketplace. In response to a 3D model marketplace service of the online marketplace receiving the 2D image from the user's mobile device, the 3D model file catalog can be searched for relevant 3D model files and possible results relevant to the 2D image identified. The marketplace service can provide at least two options for a specific result of the possible results for selection by the user. The options can include a 3D model file provided by the rights owner ("original quality" 3D model file) and a degrade option 3D model file. The degrade option 3D model file may be a lower quality or altered version of the original quality 3D model file. In response to receiving a selection of a result, the marketplace service can communicate the selection to a destination.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
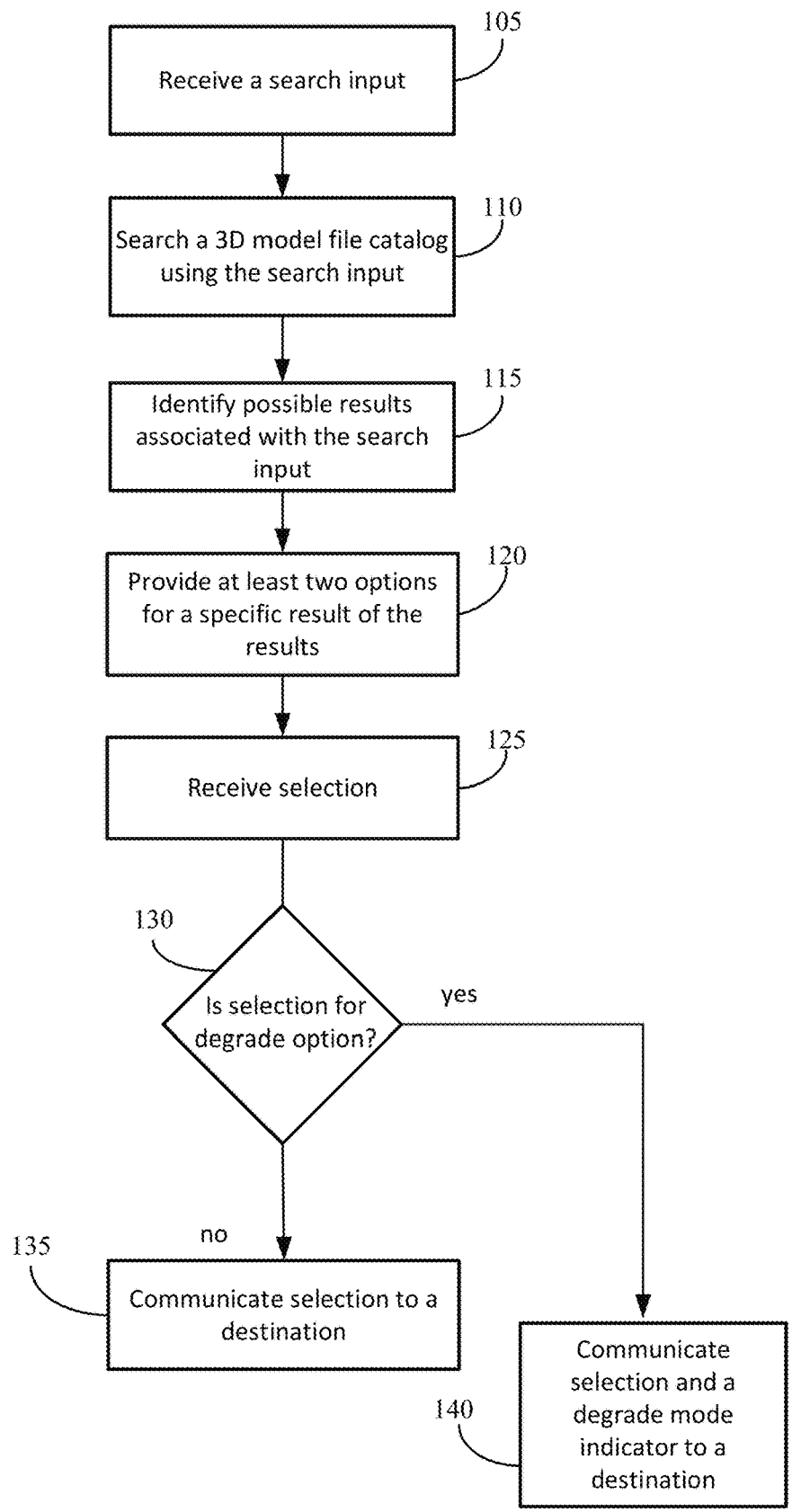
FIG. 1 illustrates an example process flow diagram for an authorized 3D model marketplace service.

Control and access of digital files for 3D model printing are supported by an authorized 3D model marketplace. An authorized 3D model marketplace is described that enables ease of search for a user and protects rights holders by instilling a degrade mode for files not having full authorized use.

According to certain embodiments, search input, such as an image, a text string, or combination thereof is used to search the marketplace. A 3D model file catalog managed as part of the 3D model marketplace (which may be embodied as described with respect to FIG. 6) can be searched using the search input to identify possible results relevant to the search input can be identified. For example, in response to the marketplace service receiving a 2D image from a marketplace application on a user's computing device (which may be embodied as described with respect to FIG. 7), the 3D model file catalog can be searched and possible results relevant to the 2D image identified.

Advantageously, the marketplace service can provide at least two options for a specific result of the possible results: a 3D model file provided by the rights owner ("original quality" 3D model file) and a degrade option 3D model file. The degrade option 3D model file may be a lower quality or altered version of the original quality 3D model file so that a user has an option to obtain a 3D printed object in a manner that minimizes adverse impact to rights holders. Examples of alterations that may be made for altered versions include, but are not limited to, one or more of changing the size of the object, changing the color of the object, changing the material the object is printed in, changing the resolution of the printing, adding a watermark to the object, adding or removing a feature or element of the object, and adding content (e.g., text and/or image(s)) onto the object. In some cases, the rights holders can indicate the type of degrade options that can be available.

It should be understood that while at least two options are available for the user to select, in some cases, only a single option of the available at least two options may be displayed to the user at a given time. For example, a user may initially be presented with the degrade option 3D model file and may later see the full/original quality option in a follow-up step.

In response to receiving a selection by the user from the options presented in the marketplace application (and communication of that selection from the marketplace application to the marketplace service), the marketplace service can communicate the selection to a destination. The destination can be, as non-limiting examples, to a specified printer, a storage location indicated by the user, a printing service, or to the file owner.

The 3D model file catalog can be stored in a structured or semi-structured format (e.g., database, graph) at a resource associated with the 3D model marketplace. Files in the 3D model file catalog can include information such as a file identifier (e.g. file name), source of file (e.g., file owner), and location of the print specification file (which can be local, available through a uniform resource locator, etc.). Images and searchable text can be included as part of the 3D model file catalog.

The information sent to the destination can be the print specification file itself and/or one or more properties of the file for the object as provided in the 3D model file catalog so that the destination can retrieve or otherwise obtain the print specification file for printing. A degrade mode indicator can be included with the properties of the file in the 3D model file catalog and/or provided as part of a message (or other type of transmitted content) to a destination. Thus, the degrade mode indicator can be provided for printing a degrade mode option (whether the indicator is provided as part of the metadata of the 3D model file or as another property, flag, bit, or other suitable indicator provided with the information about the selected file).

When a degrade option 3D model file is selected by a user, the marketplace service can send data including the degrade mode indicator to an appropriate destination. In some cases, the degrade mode indicator can be used to transform or alter an original 3D model file prior to sending the file to a printer for printing or can be provided alongside the original 3D model as instructions understood by the printer that modify the print settings such as to force a lower quality/resolution printing.

FIG. 1 illustrates an example process flow diagram for an authorized 3D model marketplace service. Referring to FIG. 1, when a search input is received by the marketplace service (105), a search of a 3D model file catalog may be performed using the search input (110). The marketplace service may be implemented by software executed on a computing system such as described with respect to FIG. 6. The search input received by the marketplace service can include, but is not limited to, at least one image, a text string, or a combination of the image(s) and the text string. Further, the type of image may include, but is not limited to, a 2D image, a 3D image, an X-ray image, and an infrared (IR) image. The image may also contain associated metadata to further aid in the search process as well as image cataloging.

The 3D model file catalog can be searched using the search input (110) and possible results relevant to the search input can be identified (115). In one embodiment, the 3D model file catalog may contain 2D images associated with an available 3D model file. The 2D images may be provided to the catalog through a variety of ways. For example, an automobile manufacturer may decide on a group of components that the company would like to include in the marketplace, because this particular group of components contains the company's most requested parts. In some cases, a component can have many different 2D images generated directly from the available 3D model, each from a different angle. The company's 2D images may then be made available in the 3D model file catalog to search against.

The 3D model file catalog may be searched using image recognition. This may be performed by the marketplace service or via an application programming interface (API) that provides image recognition services, such as available through search engines like Microsoft® Bing or Google®. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

The API is generally a set of programming instructions and standards for enabling two or more applications to communicate with each other and is commonly implemented over the Internet as a set of Hypertext Transfer Protocol (HTTP) request messages and a specified format or structure for response messages according to a REST (Representational state transfer) or SOAP (Simple Object Access Protocol) architecture.

A visual search algorithm may be used to compare the search input against the 3D model file catalog images to find and identify possible results relevant with the search input. In certain embodiments, after a successful search (e.g. an indication that the user selected one of the files for printing based on their search input), the images used for the search input may be included in the marketplace along with the existing images. This process may be performed using image cataloging. The image's associated metadata may provide support for image cataloging. Image cataloging may allow the accuracy of the visual search algorithm to grow through machine learning and provide users with a faster, more accurate result.

The 3D model file catalog search may be completed on a 3D model file catalog stored at a local server. The 3D model file catalog may be a collection of structured data or semi-structured data, such as a database or a graph. Furthermore, the data can be information or elements that contain various properties. According to certain embodiments, an option that may store the indication of degrade mode ("degrade mode indicator") can be included as one of the properties of a 3D model file. Thus, when data is sent to a destination, the degrade mode indicator can be included. In some cases, the degrade mode indicator may be a property assigned by the system. In other cases, the degrade mode indicator can be a property indicated by the file owner. For example, if a 3D model file is received by the marketplace from the file owner and a degrade mode indicator is not included as a property in the 3D model file, the system may assign a degrade mode indicator to the 3D model file.

According to certain embodiments, the system may assign the same degrade mode indicator to any 3D model file received without the indicator assigned as a property. This degrade mode indicator may be a system wide degrade mode indicator. For example, the system may assign a resolution value and watermark (or other distinctive marker indicating non-original version). In some embodiments, the system may assign a different degrade mode indicator to different 3D model files that are received without a degrade mode indicator assigned by a file owner.

While the search may first be completed on the 3D model file catalog stored on a local server, in order to identify possible results relevant to the input, it may be necessary for the marketplace service to communicate with other systems, via a network, that have knowledge of other existing 3D model files. For example, a separate system may provide access to additional storage, such as another database. The separate system may be accessible through the cloud and contain a separate 3D model file catalog with additional images.

However, it may be possible that no match is found during the search process. According to certain embodiments, if no match is found, a message may be displayed to the user. The message may inform the user that a match was not found or instruct the user to refine the search input.

Once the possible results associated with the search input have been found (e.g., the image recognition process finds a match to the 2D image), the marketplace service can then provide at least two options for a specific result of the results associated with the search input to the user (120). The options can include an original quality 3D model file and a degrade option 3D model file. The original quality 3D model file may be the authorized (by the rights holder) 3D model file, which is stored at an associated resource of the service or at a known location (such as at an authorized printing service).

Although provided as an option for selection, the degrade option 3D model file may not actually be present in the 3D model file catalog or available from a different system in the network. Instead, the degrade option 3D model file may be a lower quality or altered version of the original quality 3D model file that is altered at the time of selection or printing. Indeed, the authorized 3D model marketplace not only provides a degrade option, but also can modify an original file to provide protections to rights holders for their content. For example, the degrade option 3D model file can be generated from the original quality 3D model file upon selection (by a user) of the degrade option 3D model file and the particular modification performed can be identified by the degrade mode indicator (which can be associated with the file).

The original quality 3D model file may be provided for a purchase price higher than that of the degrade option 3D model file. The options provided to the user may be provided by level of quality (e.g., resolution, detail, etc.). According to certain embodiments, the higher the level of quality of the 3D model file, the higher the price may be. Further, the degrade option 3D model file may be presented to the user for free. For example, a user might search for a specific hose for their vehicle. After the search process has been completed, the user may then be presented with an option to purchase an original quality 3D model of the hose. The original quality 3D model file can contain the same look and same materials as the original hose from the manufacturer and may be listed for a fee, such as $25.00. Instead of the original quality 3D model, the user may also have the option of printing a degrade option 3D model of the hose for free. However, the degrade option 3D model may not have the same look as the original quality 3D model file, meaning it may be printed with a different color, with a watermark, or with a lower quality material than the original 3D model. Further, the degrade option 3D model may be printed with a lower quality/resolution printing setting.

According to certain implementations, a user can select the destination and type of delivery of the 3D model file and/or associated print specification file. A user may be presented with different options for delivery based on the different qualities provided to the user. The options may be presented in the same screen of the user interface (UI) in which the user selects the 3D model file (when using their marketplace application) or, in some cases, a separate UI may be displayed on the user's device before or after the user selects the 3D model file. The destination can be, for example, to a storage location indicated by the user, to a specified printer (associated with a user computing device), or a third party printer and/or computing system, such as a printing service operated by the file owner or authorized vendor.

There does not have to be a standard regarding all of the 3D printers to which the marketplace service may send the 3D model file (or instructions regarding same). Further, the 3D model file, which describes the 3D model, can have certain digital rights management or inherent features such that it cannot be printed itself.

Based on whether the user's selection of the 3D model (and optionally the destination and/or and delivery) received (125) via the marketplace application is a degrade mode option or not (see determination 130), the marketplace service can perform certain actions. If the selection is not for the degrade option 3D model file, and is thus for the original quality 3D model file, the marketplace service can communicate the selection to a destination without modifying the file (135).

If the marketplace service determines the selection is for the degrade option 3D model file, the marketplace service communicates the selection with the degrade mode indicator to the destination (140). The degrade mode indicator may include an indication to modify or alter the original quality 3D model file prior to sending the associated print specification file and thus "degrade" the quality of the original quality 3D model file. The degrade mode indicator may also include instructions understood by the destination printer that modify the print settings, such as to force a lower quality/resolution printing. Indeed, the authorized 3D model marketplace not only provides a degrade option, but also can modify an original file to provide protections to rights holders for their content. Examples of alterations that may be made for altered versions include, but are not limited to, one or more of changing the size of the object, changing the color of the object, changing the material the object is printed in, changing the resolution of the printing, adding a watermark to the object, adding or removing a feature or element of the object, and adding visual content (e.g., text and/or image(s)) onto the object. In some cases, the rights holders can indicate the type of degrade options that can be available. The degrade mode of the authorized, original 3D model file can protect the rights of the file owner.

An example of a user selecting a degrade option 3D model file may include a user searching for a figure of Mickey Mouse™ from the Walt Disney Company in the marketplace and being presented with an original 3D model figure, which is the official model, and a degrade option 3D model that has a pedestal and other alterations. There may even be a second (or more) degrade option 3D model with different alterations applied (e.g., one may simply be a lower resolution option). The official model may be more expensive than the degrade option(s). In this instance, the user can select and print the degrade option 3D model file (which may be free or at a low cost).

According to certain embodiments, after the specific 3D model file is selected by a user, the service can communicate the request to a destination. The request may include the print specification file and/or the file identifier (which may be a file name or unique identifier). For the case where a degrade option is selected by the user, the request communicated to the destination can also include a degrade mode identifier. Of course, other information may be included in the communications between the service and the destination.

Figure 2:
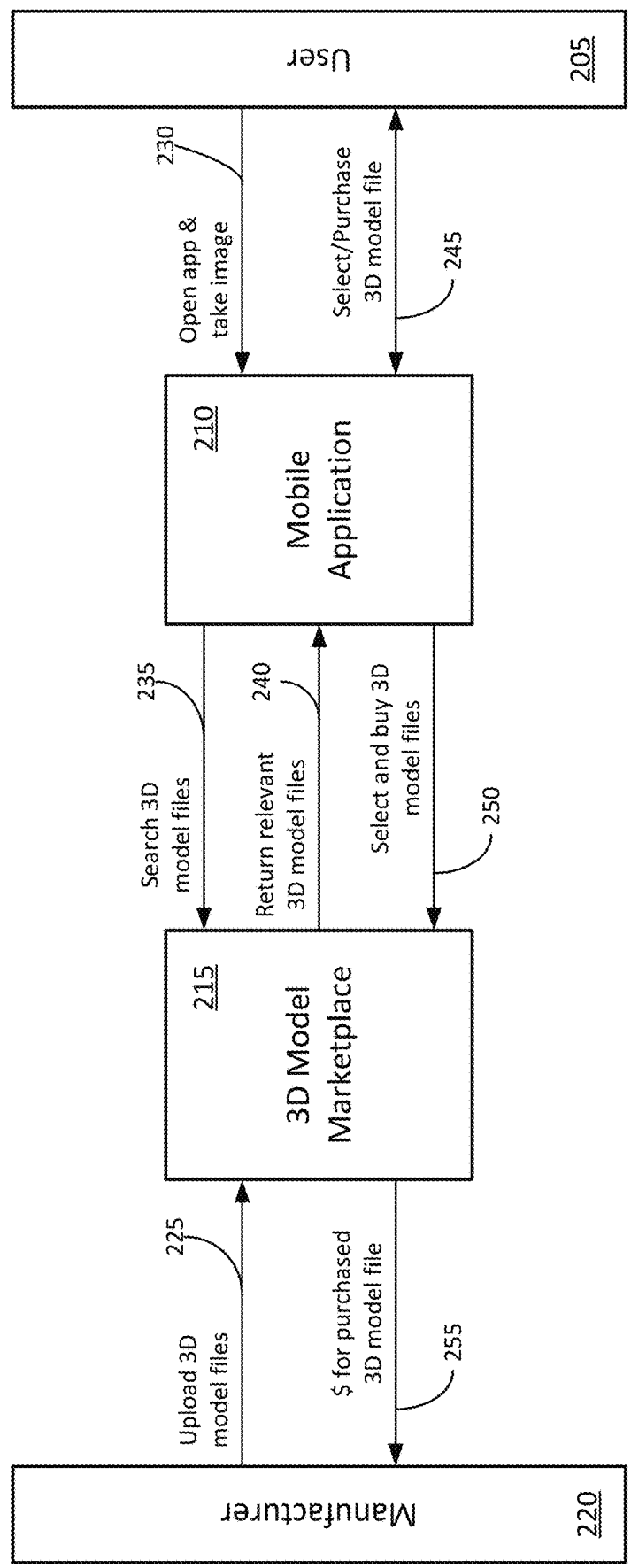
FIG. 2 illustrates an example operational scenario for an authorized 3D model marketplace.

FIG. 2 illustrates an example operational scenario for an authorized 3D model marketplace. Interactions between a user 205, marketplace application 210 (executed by a processing system of a computing device), 3D model marketplace 215 (executed by one or more servers), and a manufacturer 220 (with authorized use or ownership of print files) are described. Referring to FIG. 2, a 3D model marketplace 215 can be populated with items/files. In order to populate the marketplace 215, manufacturer 220, or other file owners, can upload (225) 3D model files or information about available 3D model files to the marketplace 215. The 3D model files (and/or information about available 3D model files) may be stored in the marketplace 215 and accessed through a 3D model file catalog in order to be used in future searches.

With regard to using the marketplace 215, a user 205 of a mobile marketplace application 210 can open the marketplace application 210 on their mobile device and capture an image (230). The image may be captured using the mobile device's camera or other input device. In some cases, the image may be an image stored locally on the mobile device and opened in the marketplace application 210. In some cases, the image may be obtained from some other sources (e.g., downloaded after a search or from a website).

The marketplace application 210 can communicate the image to the 3D model marketplace 215 to search (235) the 3D model file catalog. The 3D model files that are searched during the search process may be the 3D model files uploaded to the marketplace 215 by the manufacturer 220, the 3D model files that have been uploaded to the marketplace 215 by file owners and/or the 3D model files managed by other systems accessed through the network. The 3D model files may be searched, using image recognition, by either the marketplace service or via an API that provides image recognition services. Once the marketplace 215 identifies possible results associated with the image, information of the relevant 3D model files can be returned to the marketplace application 210 (240). The marketplace application 210 can then provide information of the relevant 3D model files to the user 205 in a user interface (UI) displayed at the user's computing device. Using the UI, the user 205 may then select the 3D model file they would like to purchase (245) and the marketplace application 210 can receive the selection.

Once the user 205 selection is received by the marketplace application 210, the marketplace application 210 can, through the marketplace service, enable the user 205 to select and buy the 3D model files (250) from the marketplace 215. The user 205 may also be able to select a destination for the selected file, which may be simply a request to print the object at a selected authorized printer or to obtain a copy of the print specifications so that the user 205 can print using their own printer (or third party).

In addition to communicating selections to various printing destinations, the marketplace 215 can send an appropriate amount of money for the purchased 3D model file (255) to the file owner or to manufacturer 220 to, for example, print the object. Of course, payment can be made according to any suitable scheme.

Four example scenarios and options are provided in the sections below.

Example 1—File Location: Locally for the Server

A file owner has uploaded a 3D model file of a valve part to the marketplace during operation 225. Since the 3D model file is stored locally in the marketplace, when a user selects to print the valve part, the marketplace service may send the print specification file to any requested destination of the user (with or without degrade mode indicator).

Example 2—File Location: Other

A file owner has not included or uploaded the 3D model file to the marketplace when registering availability of the 3D model file during operation 225. Since the 3D model file is not stored locally, when a user selects that object, the service communicates with the location identified by the catalog to either request the file or request that the object be printed. In a case where a degrade mode option is selected by a user, the system can communicate a degrade mode indicator to the system storing the file along with the file identifier to identify the file that is being requested for printing.

Example 3—Degrade Mode Indicated by the File Owner

During operation 225, a file owner can indicate the option(s) for degrade mode. The degrade mode options can be stored in the 3D model file catalog. These options may, in some cases, supersede any default degrade options provided by the service and may restrict the types of degrade options available to a user. A single file may still be stored and/or used by the system for a particular object; however, the various degrade options can be indicated associated with the file and applied to the file when a user selects that file for printing/purchase.

Example 4—Degrade Mode Assigned by the System

A file owner may simply provide a file or information about a file's availability and not indicate restrictions or preferences regarding degrade mode. In that case, the system can assign certain default degrade mode options and either store those options associated with the file in the catalog or apply the default indicator upon a user selection of a degrade mode option.

Figure 3:
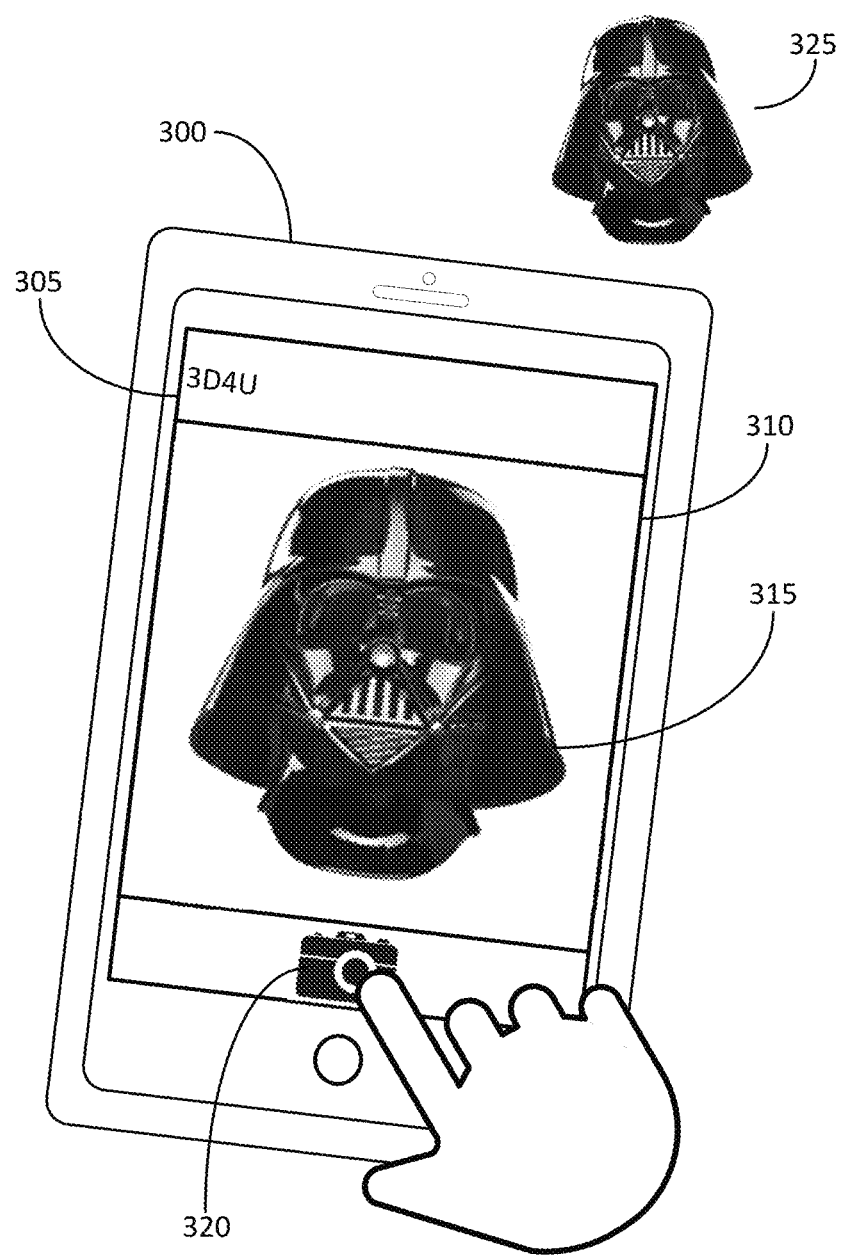
FIG. 3 illustrates an example user interface of a marketplace application at a capture stage for performing a search of an authorized 3D model marketplace.

FIG. 3 illustrates an example user interface of a marketplace application at a capture stage for performing a search of an authorized 3D model marketplace. Referring to FIG. 3, in order to access the authorized marketplace, a user may open a marketplace application 305 on their computing device 300. The computing device 300 can be any computing device such as, but not limited to, a laptop computer, a desktop computer, a tablet, a personal digital assistant, a smart phone, a smart television, a gaming console and the like. The user may then be presented with a search input window 310 for providing a search input to be used when searching a 3D model file catalog for a match.

According to certain embodiments, the user can choose an object they wish to have 3D printed, such as desired object 325. The user can then take a photograph of the desired object 325, via a camera on the computing device 300. When the user selects the camera icon 320, a 2D image 315 of the desired object 325 is captured and displayed in the search input window 310 and the 2D image 315 may then become the search input. Of course, embodiments are not limited to a 2D image. The search input may also be multiple images, a text string, or a combination of the image(s) and the test string. Further, the image may be, but is not limited to, a 2D image, a 3D image, an X-ray image, or an infrared (IR) image depending on scenario.

By way of example, a user may see a figure of Darth Vader™ (Star Wars:™ & © Lucasfilm Ltd) and decide they would like to purchase a similar 3D printed model of the figure from the marketplace. Since the user already has access to the Darth Vader™ figure, the user can open the marketplace application on their mobile device and take a picture of the object with their camera. The 2D image of Darth Vader™ then becomes the search input that may be used to search the 3D model file catalog.

Figure 4:
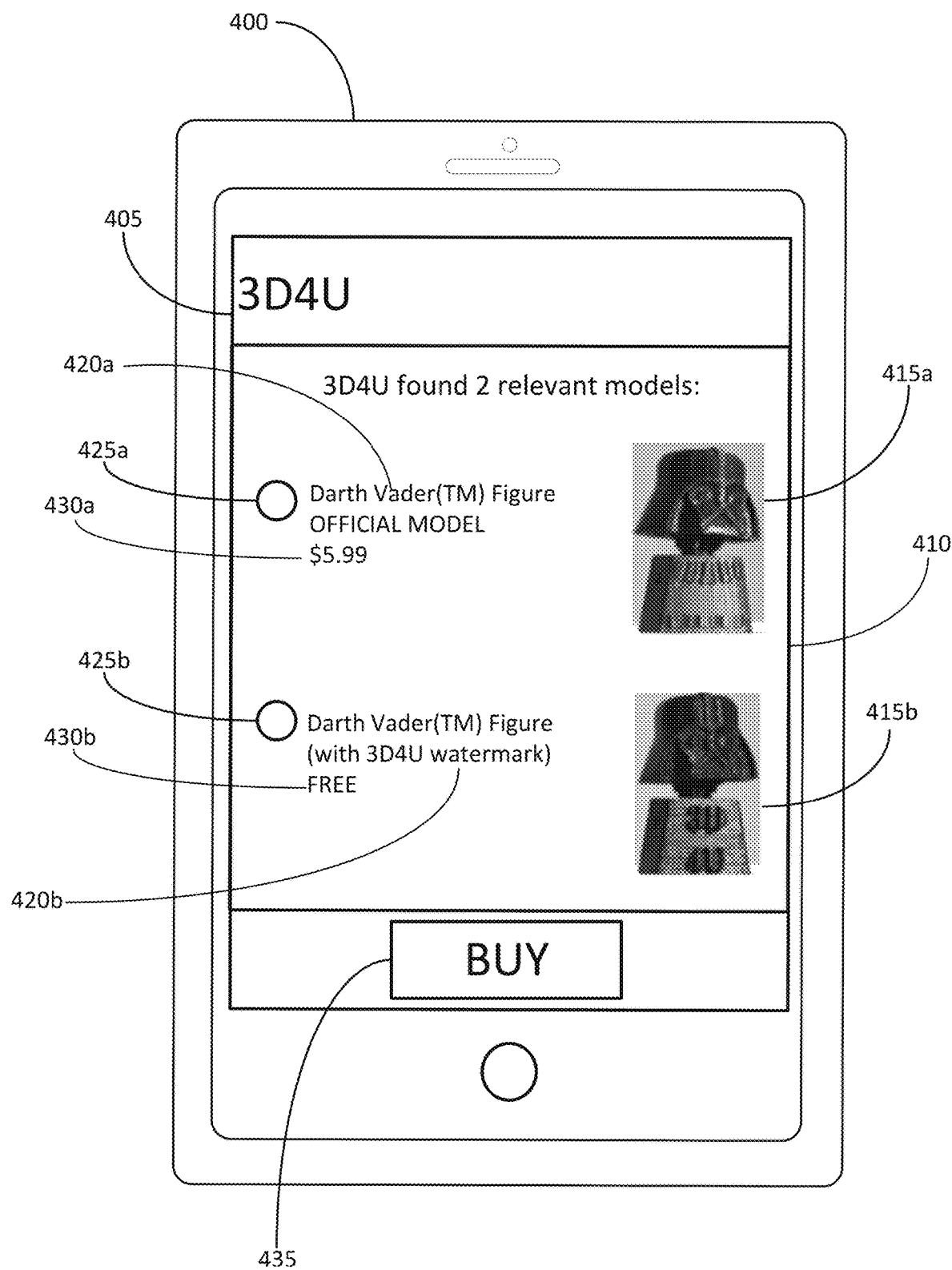
FIG. 4 illustrates an example user interface of a marketplace application after receiving possible results from the authorized 3D model marketplace after the actions illustrated in FIG. 3.

FIG. 4 illustrates an example user interface of a marketplace application after receiving possible results from the authorized 3D model marketplace after the actions illustrated in FIG. 3. Referring to FIG. 4, while running the marketplace application 405 on a computing device 400, once the possible results associated with the search results are identified, the user is provided with at least two options for a specific result of the results associated with the search input in a selection window 410. The selection window 410 may contain two images of the possible 3D models 415a and 415b, 3D model file descriptions 420a and 420b, prices 430a and 430b, as well two associated selection icons 425a and 425b. The computing device 400 can be any computing device such as, but not limited to, a laptop computer, a desktop computer, a tablet, a personal digital assistant, a smart phone, a smart television, a gaming console and the like.

The original quality 3D model image 415a may provide the user with an image of the original quality 3D model, which is the authorized 3D model file obtained from the file owner. The original quality 3D model file description 420a can let the user know that the original quality 3D model file is the official model. Since the original quality 3D model file is the official model, there may be a price 430a associated with the original quality 3D model file that is higher than the degrade option 3D model file, which is shown in the example as being free.

The degrade option 3D model image 415b may provide the user with the image of the degrade option 3D model, which reflects an altered 3D model file of the original quality 3D model file obtained from the file owner. The degrade option 3D model file description 420b, can let the user know that the degrade option 3D model file may be degraded and how it is degraded. For example, if the degrade option 3D model file is degraded using a watermark, the degrade option 3D model file descriptor 420b may state what the watermark contains, such as "(with 3D4U watermark)".

When the user has made their choice, they can select one of the associated selection icons, such as the original quality 3D model file selection icon 425a or the degrade option selection icon 425b. After making their selection, the user may finalize their purchase by selecting the purchase icon 435 in the marketplace application 405. In addition, it should be appreciated that a plurality of 3D model file selections can be made by the user in the marketplace application 405 during one transaction. That is, a user may decide to select both the original quality 3D model file and the degrade option 3D model file at the same time, as well as search for a separate 3D model file before finalizing their purchase. The plurality of 3D model file selections may be managed in a variety of ways, such as, but not limited to, employing shopping cart software or other ecommerce software on the marketplace application. Furthermore, as mentioned above, in some cases, just the degrade mode option may be presented in the selection window 410. This scenario can support a case where user may first experiment with the degrade mode option and then in a follow-up step purchase the original quality option.

According to certain implementations, a user can select the destination and type of delivery for the 3D model file. A user may be presented with different options for delivery based on the different qualities provided to the user. The destination can be, for example, to the user's marketplace application, to a specified printer (associated with a user computing device), or to a third party printer and/or computing system, such as a printing service or the file owner. The destination and delivery options (not shown) may be presented in the selection window 410. For example, if the user selects the original quality 3D model file, the user may be able to request the 3D model be printed and delivered from the file owner, such as the manufacturer of the 3D model. In another example, if the user selects the degrade option 3D model file, the user may be able to request the 3D model file and associated print specification file sent directly to their home 3D printer.

In yet another embodiment, the delivery options may be provided to the user in a separate UI before or after the user finalizes their purchase by selecting the purchase icon 435. In an example where the delivery options are presented in a separate UI, the user may desire to purchase the original quality 3D model file. The user can then select the original quality 3D model file selection icon 425a as well as the purchase icon 435 to finalize their purchase. Once the purchase has been finalized, a UI may be presented to the user with several options for the destination and delivery of their 3D model file and/or associated print specification file.

The example UI of FIG. 4 shows the continuation of the example in FIG. 3, in which a 2D image of Darth Vader™ was used for the search input. In the current example, the user is provided with two options for a specific result of the results associated with the Darth Vader™ image (e.g., the search input) in the selection window 410. One of the results listed is the original quality 3D model file and another result listed is the degrade option 3D model file. The original quality 3D model image 415a is displayed to the user along with the original quality 3D model file description 420a and the price 430a. The original quality 3D model file description 420a states "Darth Vader™ Figure OFFICIAL MODEL" and the price 430a is "$5.99". Since the original quality 3D model file is the authorized, official model and is obtained from the file owner, there is no degradation of the 3D model file.

The degrade option 3D model image 415b is displayed to the user along with the degrade option 3D model file description 420a and the price 430a. The degrade option 3D model file description 420a states "Darth Vader™ Figure (with 3D4U watermark)" and the price 430a is "FREE". Since the degrade option 3D model file is the low quality or altered version of the original quality 3D model file, a degrade mode indicator must be assigned to the 3D model before the print specification file is sent out to the appropriate destination. In this case, the degrade option 3D model file is degraded with a watermark that contains the name of the marketplace application, "3D4U".

According to certain embodiments, the degrade mode indicator may be a system wide degrade mode indicator that is incorporated into the marketplace. The system wide degrade mode indicate means that all degrade option 3D model files that can have the degrade mode assigned by the system may contain the same degrade mode and the user can have no option to customize the type of degradation used. For example, all of the degrade option 3D model files presented to the user will be presented with the same degrade option, such as printed in the color purple, printed in lower resolution, etc. In yet another embodiment, the user may have the choice of which degrade mode indicator they would like to assign to the degrade option 3D model file, such as printing the 3D model file in a different material than the original quality 3D model file or sending a signal to the printer to print in a low quality printing setting.

Figure 5:
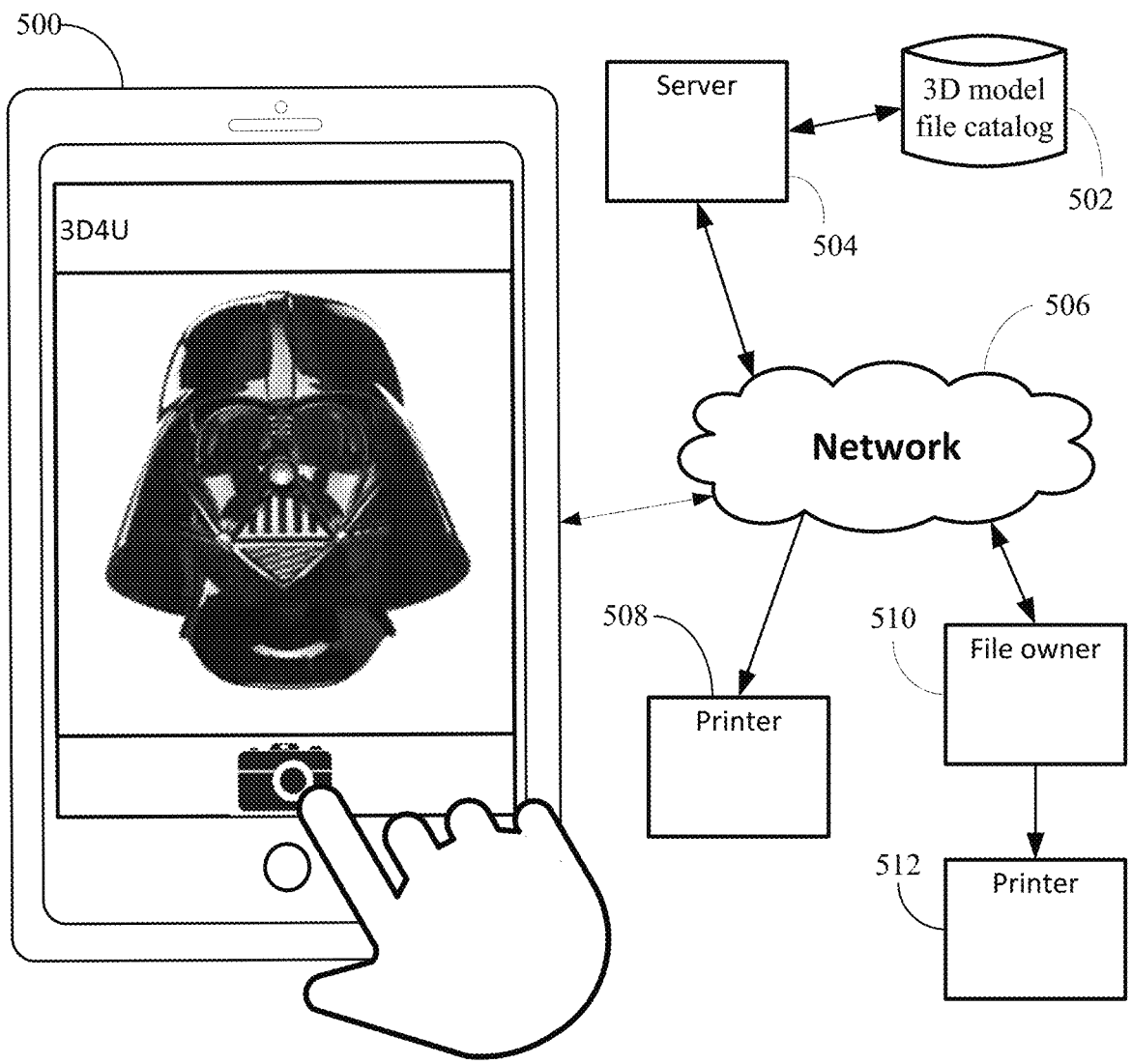
FIG. 5 illustrates an example operating environment.

FIG. 5 illustrates an example operating environment. Referring to FIG. 5, a user may open the marketplace application on his/her computing device 500 to provide a search input to search the marketplace. When the user opens the marketplace application, the user is able to capture an image or enter a text string to provide the search input. The computing device 500 can be any computing device such as, but not limited to, a laptop computer, a desktop computer, a tablet, a personal digital assistant, a smart phone, a smart television, a gaming console and the like.

The search input may be used to search a 3D model file catalog 502 to identify possible matches. In order to provide the 3D model files for image recognition, previously used search input, as well as 3D model files uploaded from file owners, can be stored in a marketplace and accessed through the 3D model file catalog 502 that can be connected to a server 504. The 3D model file catalog 502 may be directly connected to the server 504 or connected to the server 504 over a network such as network 506.

The network 506 can be, but is not limited to, a cellular network (e.g., wireless phone), a point-to-point dial up connection, a satellite network, the Internet, a local area network (LAN), a wide area network (WAN), a WiFi network, an ad hoc network or a combination thereof. Such networks are widely used to connect various types of network elements, such as hubs, bridges, routers, switches, servers, and gateways. The network 506 may include one or more connected networks (e.g., a multi-network environment) including public networks, such as the Internet, and/or private networks such as a secure enterprise private network. Access to the network 506 may be provided via one or more wired or wireless access networks as will be understood by those skilled in the art.

In one embodiment, to carry out the search process and 3D model file modification, the creation and maintenance of the marketplace which can be stored locally on the computing device 500 and/or on the server 504 (having the 3D model file catalog 502) and/or stored using a cloud service is performed.

Further embodiments provide for the 3D model file and/or associated print specification to be sent to an appropriate destination after the user has made a selection. In one embodiment, the destination selected by the user may be a specified printer 508. The specified printer 508 may be associated with the user computing device 500. In another embodiment, the destination selected by the user may be a file owner 510. Once the print request is received by the file owner 510, from the marketplace service, the file owner 510 may send the received print request to a specified printer 512 associated with the file owner computing system. The marketplace and the various destinations can communicate over network 506. According to other embodiments, the destination may also be back to the marketplace application (at device 500) or to a printing service.

Figure 6:
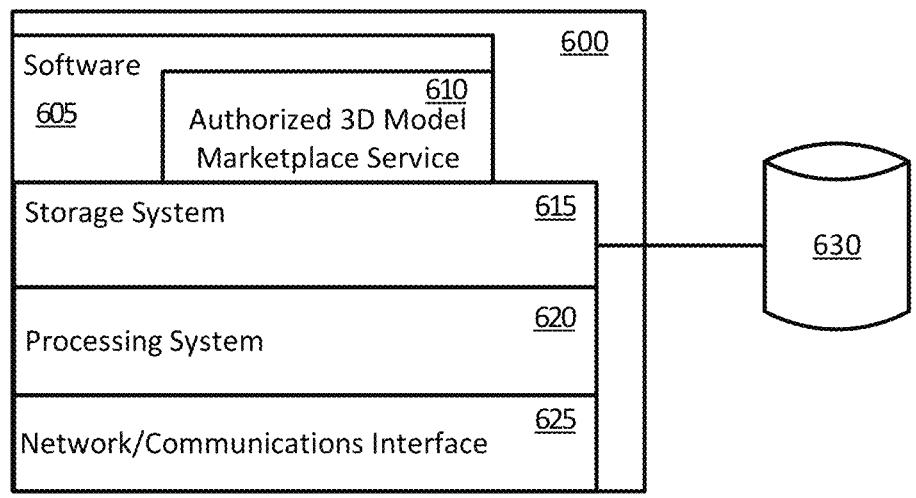
FIG. 6 illustrates components of a computing system that may be used to implement certain methods and services described herein.

FIG. 6 illustrates components of a computing system that may be used to implement certain methods and services described herein. Referring to FIG. 6, system 600 may be implemented within a single computing device or distributed across multiple computing devices or sub-systems that cooperate in executing program instructions. The system 600 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 600 can include a processing system 620, which may include one or more processors and/or other circuitry that retrieves and executes software 605 from storage system 615. Processing system 620 may be implemented within a single processing device but may also be distributed across multiple processing devices or sub-systems that cooperate in executing program instructions.

Examples of processing system 620 include general purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general purpose CPU.

Storage system(s) 615 can include any computer readable storage media readable by processing system 620 and capable of storing software 605. Storage system 615 may include volatile and nonvolatile, removable and non-removable media implemented in any method or technology for storage of information, such as computer readable instructions, data structures, program modules, or other data. Examples of storage media include random access memory, read only memory, magnetic disks, optical disks, CDs, DVDs, flash memory, virtual memory and non-virtual memory, magnetic cassettes, magnetic tape, magnetic disk storage or other magnetic storage devices, or any other suitable storage media. In no case is the storage medium of storage system a propagated signal or carrier wave.

In addition to storage media, in some implementations, storage system 615 may also include communication media over which software may be communicated internally or externally. Storage system 615 may be implemented as a single storage device but may also be implemented across multiple storage devices or sub-systems co-located or distributed relative to each other. Storage system 615 may include additional elements, such as a controller, capable of communicating with processing system 620.

In some cases, storage system 615 includes data for a 3D model file catalog 630. In other cases, the data for the 3D model file catalog 630 is part of a separate system with which system 600 communicates, such as a remote storage provider. For example, data, such as search input or a selected 3D model file, may be stored on any number of remote storage platforms that may be accessed by the system 600 over communication networks via the communications interface 625. Such remote storage providers might include, for example, a server computer in a distributed computing network, such as the Internet. They may also include "cloud storage providers" whose data and functionality are accessible to applications through OS functions or APIs.

Software 605 may be implemented in program instructions and among other functions may, when executed by system 600 in general or processing system 620 in particular, direct the system 600 or processing system 620 to operate as described herein for generating and supporting an authorized 3D model marketplace (with service 610).

Software 605 may also include additional processes, programs, or components, such as operating system software or other application software. It should be noted that the operating system may be implemented both natively on the computing device and on software virtualization layers running atop the native device operating system (OS). Virtualized OS layers, while not depicted in FIG. 6, can be thought of as additional, nested groupings within the operating system space, each containing an OS, application programs, and APIs.

Software 605 may also include firmware or some other form of machine-readable processing instructions executable by processing system 620.

System 600 may represent any computing system on which software 605, including the marketplace service 610, may be staged and from where software 605 may be distributed, transported, downloaded, or otherwise provided to yet another computing system for deployment and execution, or yet additional distribution.

In embodiments where the system 600 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 625 may be included, providing communication connections and devices that allow for communication between system 600 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface can be controlled by the OS, which informs applications of communications events when necessary.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Figure 7:
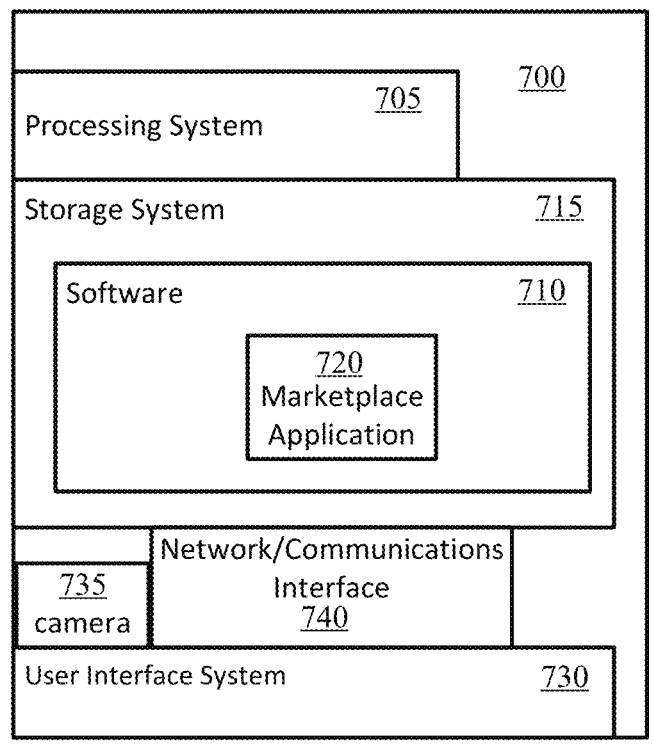
FIG. 7 illustrates components of a computing device that may be used in certain implementations described herein.

FIG. 7 illustrates components of a computing device that may be used in certain implementations described herein. Referring to FIG. 7, system 700 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, or a smart television. Accordingly, more or fewer elements described with respect to system 700 may be incorporated to implement a particular computing device.

System 700 includes a processing system 705 of one or more processors to transform or manipulate data according to the instructions of software 710 stored on a storage system 715. Examples of processors of the processing system 705 include general purpose central processing units, application specific processors, and logic devices, as well as any other type of processing device, combinations, or variations thereof. The processing system 705 may be, or is included in, a system-on-chip (SoC) along with one or more other components such as network connectivity components, sensors, video display components.

The software 710 can include an operating system and application programs such as a marketplace application 720 that accesses components of system 700 (as permitted by the operating system) and communicates with an authorized 3D model marketplace as described herein. Device operating systems generally control and coordinate the functions of the various components in the computing device, providing an easier way for applications to connect with lower level interfaces like the networking interface. Non-limiting examples of operating systems include Windows® from Microsoft Corp., Apple® iOS™ from Apple, Inc., Android® OS from Google, Inc., and the Ubuntu variety of the Linux OS from Canonical.

It should be noted that the operating system may be implemented both natively on the computing device and on software virtualization layers running atop the native device operating system (OS). Virtualized OS layers, while not depicted in FIG. 7, can be thought of as additional, nested groupings within the operating system space, each containing an OS, application programs, and APIs.

Storage system 715 may comprise any computer readable storage media readable by the processing system 705 and capable of storing software 710 including the marketplace application 720.

Storage system 715 may include volatile and nonvolatile, removable and non-removable media implemented in any method or technology for storage of information, such as computer readable instructions, data structures, program modules, or other data. Examples of storage media of storage system 715 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium a propagated signal or carrier wave.

Storage system 715 may be implemented as a single storage device but may also be implemented across multiple storage devices or sub-systems co-located or distributed relative to each other. Storage system 715 may include additional elements, such as a controller, capable of communicating with processing system 705.

Software 710 may be implemented in program instructions and among other functions may, when executed by system 700 in general or processing system 705 in particular, direct system 700 or the one or more processors of processing system 705 to operate as described herein.

The system can further include user interface system 730, which may include input/output (I/O) devices and components that enable communication between a user and the system 700. User interface system 730 can include input devices such as a mouse, track pad, keyboard, a touch device for receiving a touch gesture from a user, a motion input device for detecting non-touch gestures and other motions by a user, a microphone, and other types of input devices and their associated processing elements capable of receiving user input. Camera 735 may be used by or be considered part of user interface system 730 when used to capture certain types of user input such as non-touch gestures. Otherwise, camera 735 can be used to capture still and/or moving (e.g., video) images, including those captured and communicated to the authorized 3D model marketplace.

The user interface system 730 may also include output devices such as display screen(s), speakers, haptic devices for tactile feedback, and other types of output devices. In certain cases, the input and output devices may be combined in a single device, such as a touchscreen display which both depicts images and receives touch gesture input from the user.

Visual output may be depicted on the display in myriad ways, presenting graphical user interface elements, text, images, video, notifications, virtual buttons, virtual keyboards, or any other type of information capable of being depicted in visual form.

The user interface system 730 may also include user interface software and associated software (e.g., for graphics chips and input devices) executed by the OS in support of the various user input and output devices. The associated software assists the OS in communicating user interface hardware events to application programs using defined mechanisms. The user interface system 730 including user interface software may support a graphical user interface, a natural user interface, or any other type of user interface. For example, the interfaces for the productivity application and/or the productivity tool for assisted content authoring (and corresponding functionality) described herein may be presented through user interface system 730.

Communications interface 740 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

Embodiments of the described marketplace service and marketplace application may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

By way of example, and not limitation, computer-readable storage media may include volatile and non-volatile, removable and non-removable media implemented in any method or technology for storage of information such as computer-readable instructions, data structures, program modules or other data. Examples of computer-readable storage media include volatile memory such as random access memories (RAM, DRAM, SRAM); non-volatile memory such as flash memory, various read-only-memories (ROM, PROM, EPROM, EEPROM), phase change memory, magnetic and ferromagnetic/ferroelectric memories (MRAM, FeRAM), and magnetic and optical storage devices (hard drives, magnetic tape, CDs, DVDs). As used herein, in no case does the term "storage media" consist of carrier waves or propagating signals.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A computer-implemented method for control and access of digital files for three dimensional (3D) model printing, the method comprising:
   searching a 3D model printing file catalog comprising structured data or semi-structured data using a search input to identify possible results relevant to the search input;
   providing, to a 3D model marketplace application, at least two selection options for a specific file of the possible results, the at least two selection options comprising an original quality 3D model printing file of the specific file and a degrade option 3D model printing file of the specific file;
   in response to receiving a selection of the original quality 3D model printing file, via the 3D model marketplace application, communicating at least a file identifier of the specific file to a destination; and
   in response to receiving a selection of the degrade option 3D model printing file, via the 3D model marketplace application, communicating at least the file identifier of the specific file and a degrade mode indicator to the destination.

2. The method of claim 1, wherein the degrade mode indicator indicates a modification of the original quality 3D model printing file that degrades the quality of the original quality 3D model printing file.

3. The method of claim 2, wherein the modification comprises one or more of changing a size of an object represented by the original quality 3D model printing file, changing a color of the object, changing a material used for printing the object, adding a watermark to the object, adding or removing a feature or element of the object, and adding visual content onto the object.

4. The method of claim 1, wherein the degrade mode indicator comprises instructions understood by a printer that modify a print setting such as to force a lower quality or lower resolution printing.

5. The method of claim 1, wherein the destination is a specified printer or a storage location indicated by a user.

6. The method of claim 1, wherein the search input comprises at least one image of an object.

7. The method of claim 1, further comprising receiving at least information of the original quality 3D model printing file; storing the information of the original quality 3D model printing file, including the file identifier in the 3D model printing file catalog.

8. A system for control and access of digital files for three dimensional (3D) model printing, the system comprising:
- a processing system
- a storage system;
- a 3D model printing file catalog stored on at least one storage resource of the storage system, the 3D model printing file catalog comprising structured data or semi-structured data; and
- instructions stored on at least one storage resource of the storage system that when executed by the processing system, direct the processing system to provide an authorized 3D model marketplace, the instructions that direct the processing system to provide the authorized 3D model marketplace direct the system to at least:
- populate the 3D model printing file catalog with files, including at least information of an original quality 3D model printing file;
- receive, via a 3D model marketplace application, a search input;
- search the 3D model printing file catalog using the search input;
- identify possible results relevant to the search input;
- provide, to the 3D model marketplace application, at least two selection options for a specific file of the possible results, the specific file being a file corresponding to the original quality 3D model printing file, wherein the at least two selection options comprise the original quality 3D model printing file and a degrade option 3D model printing file; and
- in response to receiving a selection of the original quality 3D model printing file, via the 3D model marketplace application, communicate at least a file identifier of the specific file to a destination; and
- in response to receiving a selection of the degrade option 3D model file, via the 3D model marketplace application, communicate at least the file identifier of the specific file and a degrade mode indicator to the destination.

9. The system of claim 8, wherein the degrade mode indicator indicates a modification of the original quality 3D model printing file that degrades the quality of the original quality 3D model printing file.

10. The system of claim 9, wherein the modification comprises one or more of changing a size of an object represented by the original quality 3D model printing file, changing a color of the object, changing a material used for printing the object, adding a watermark to the object, adding or removing a feature or element of the object, and adding visual content onto the object.

11. The system of claim 8, wherein the degrade mode indicator comprises instructions understood by a printer that modify the print setting such as to force a lower quality or lower resolution printing.

12. The system of claim 8, wherein the destination is a specified printer or a storage location indicated by a user.

13. The system of claim 8, wherein the search input comprises at least one image of an object.

14. One or more computer readable storage media having instructions for an authorized three dimensional (3D) model marketplace stored thereon that when executed by a processing system, direct the processing system to:
- receive a search input from a 3D model marketplace application at a client device;
- search a 3D model printing file catalog comprising structured data or semi-structured data using search input to identify possible results relevant to the search input;
- communicate the possible results to the 3D model marketplace application, the possible results comprising at least a degrade option 3D model printing file of a specific file of the possible results; and
- in response to receiving a selection of the degrade option 3D model printing file of the specific file, associate a degrade mode indicator with the specific file.

15. The media of claim 14, wherein the instructions further direct the processing system to modify an original quality 3D model printing file according to the degrade mode indicator associated with the specific file.

16. The media of claim 15, wherein the degrade mode indicator indicates a modification of the original quality 3D model printing file.

17. The media of claim 16, wherein the modification comprises one or more of changing a size of an object represented by the original quality 3D model printing file, changing a color of the object, changing a material used for printing the object, adding a watermark to the object, adding or removing a feature or element of the object, and adding visual content onto the object.

18. The media of claim 14, wherein the degrade mode indicator comprises instructions understood by a printer that modify the print setting such as to force a lower quality or lower resolution printing.

19. The media of claim 14, wherein the instructions further direct the processing system to, in response to receiving the selection of the degrade option 3D model printing file of the specific file, communicate at least a file identifier of the specific file and the degrade mode indicator to a destination.

20. The media of claim 19, wherein the destination is a specified printer or a storage location indicated by a user.

* * * * *